No. 896,462. PATENTED AUG. 18, 1908.
I. E. QUAINTANCE.
MACHINE FOR SPREADING MANURE.
APPLICATION FILED DEC. 18, 1907.

3 SHEETS—SHEET 1.

Witnesses

Inventor
Ira E. Quaintance.
By C. A. Snow & Co
Attorneys

No. 896,462. PATENTED AUG. 18, 1908.
I. E. QUAINTANCE.
MACHINE FOR SPREADING MANURE.
APPLICATION FILED DEC. 18, 1907.

3 SHEETS—SHEET 3.

Witnesses  
Inventor  
Ira E. Quaintance.  
By C.A. Snow & Co.  
Attorneys

UNITED STATES PATENT OFFICE.

IRA E. QUAINTANCE, OF BUCYRUS, OHIO.

MACHINE FOR SPREADING MANURE.

No. 896,462. Specification of Letters Patent. Patented Aug. 18, 1908.

Application filed December 18, 1907. Serial No. 407,056.

*To all whom it may concern:*

Be it known that I, IRA E. QUAINTANCE, a citizen of the United States, residing at Bucyrus, in the county of Crawford and State of Ohio, have invented a new and useful Machine for Spreading Manure, of which the following is a specification.

This invention relates to machines for spreading manure and its object is to provide a machine of this character having mechanism whereby the same can be quickly loaded, thence drawn from place to place, the rotation of the supporting wheels being utilized for actuating the distributing cylinder to throw the material from the machine and scatter it upon the surface of the ground.

Another object is to provide a spreading or distributing cylinder which can be adjusted toward or from the load carried by the machine so that all portions thereof can be distributed.

Another object is to provide a machine having a holding frame which is adjustable vertically and thus coöperates with the distributing cylinder to insure the discharge of all the contents of the machine.

With these and other objects in view the invention consists of certain novel features of construction and combinations of parts which will be hereinafter more fully described and pointed out in the claims.

In the accompanying drawings is shown the preferred form of the invention.

Figure 1:
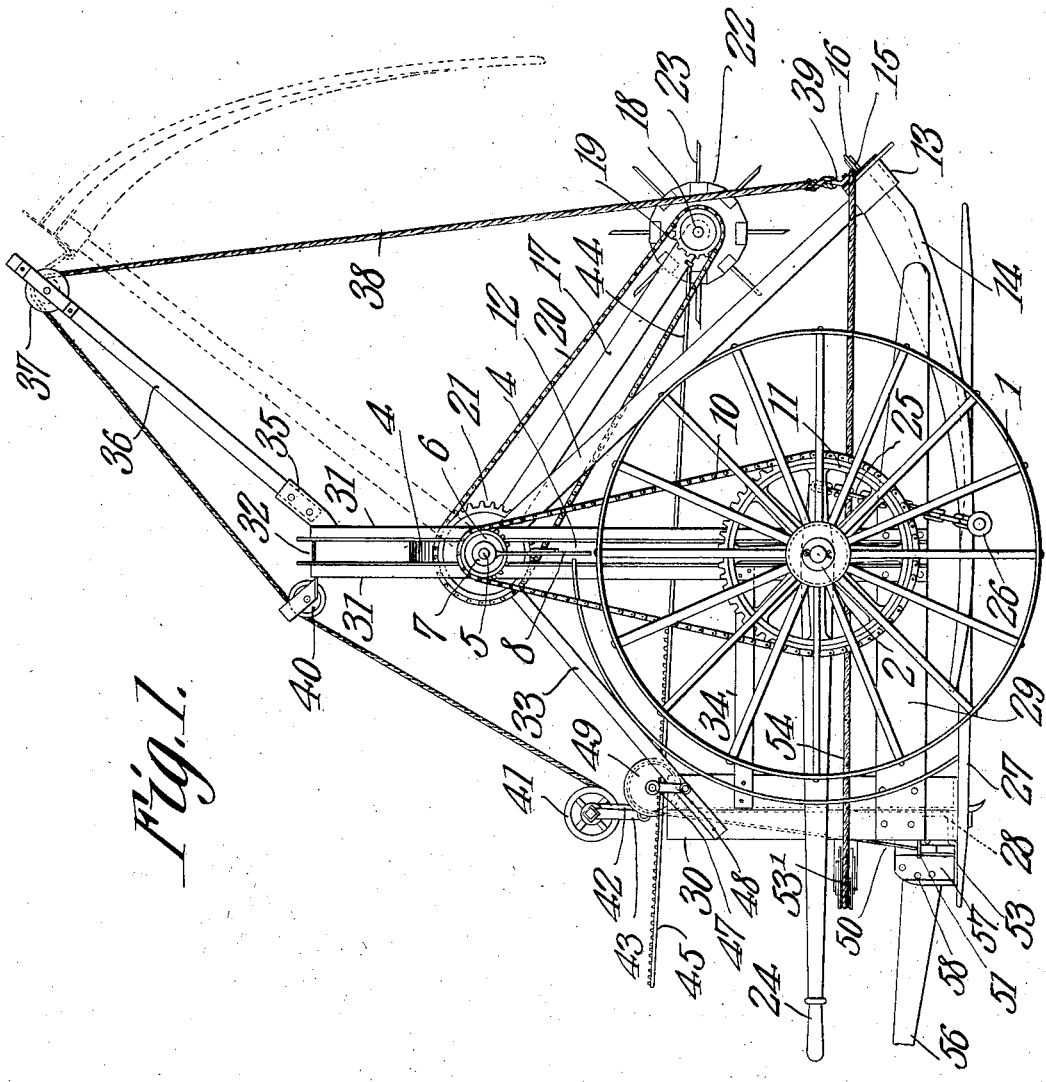
Figure 2:
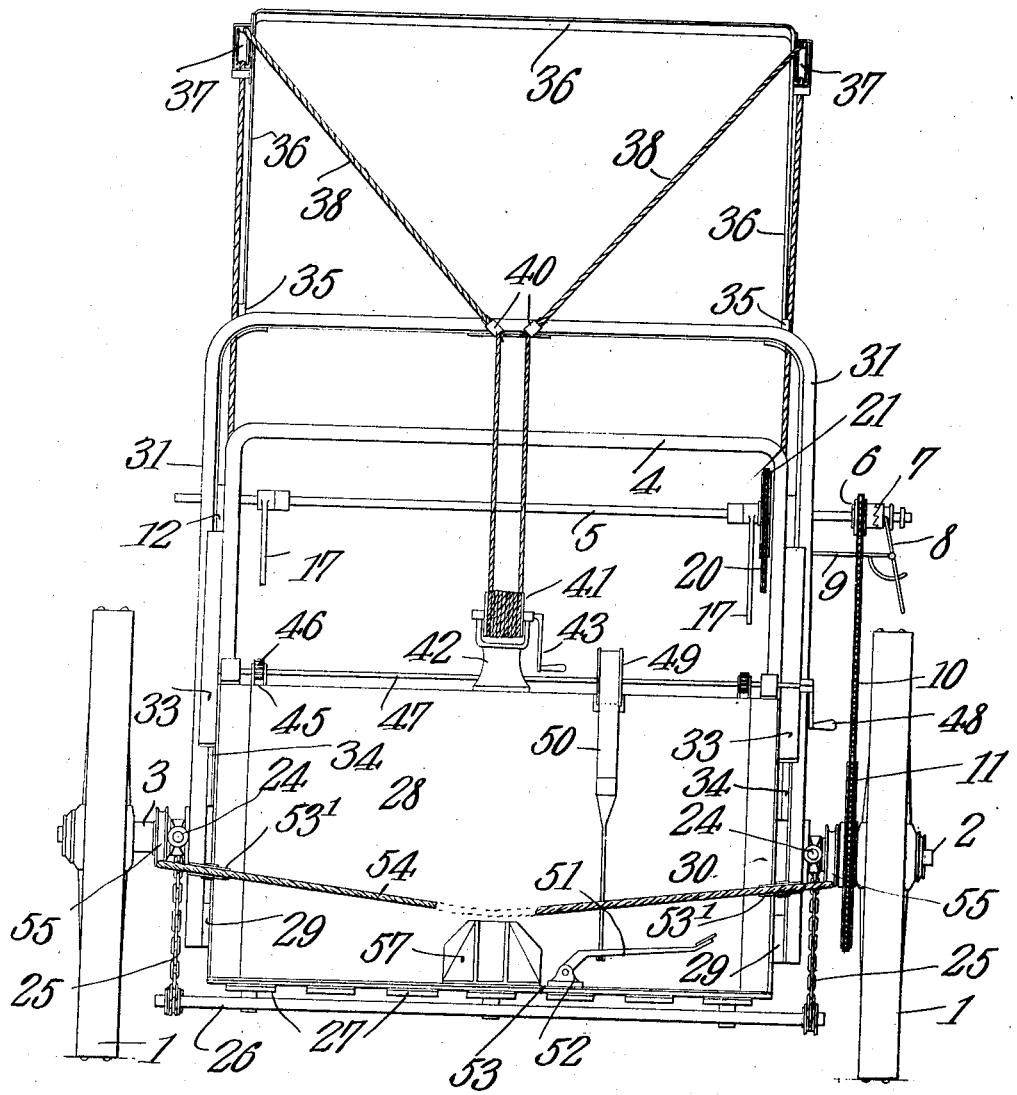
Figure 3:
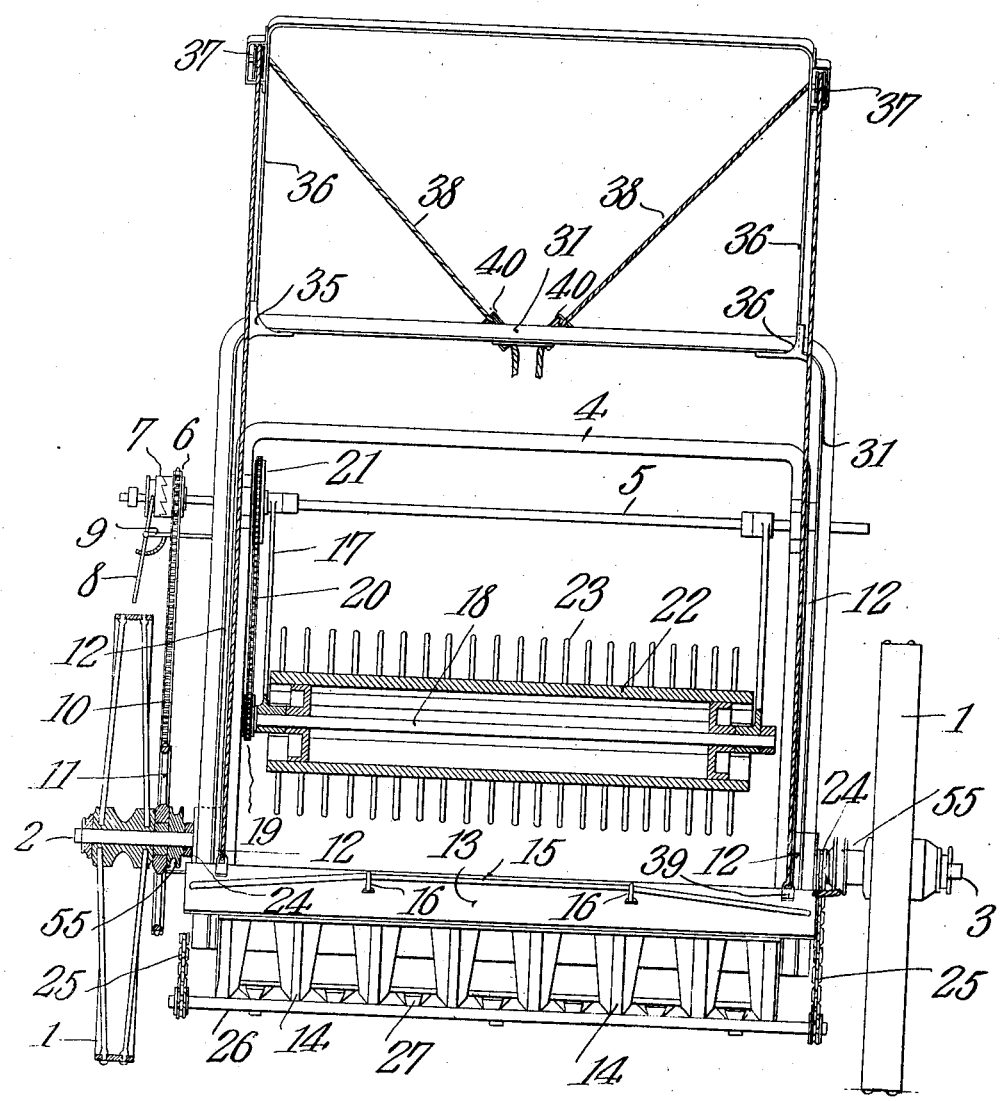

In said drawings: Figure 1 is a side elevation of a machine embodying the present improvements, the gathering fork being shown by dotted lines in raised position. Fig. 2 is a front elevation of the machine, the tongue and portions of the mechanism being removed. Fig. 3 is a view of the machine partly in rear elevation and partly in section.

Referring to the figures by characters of reference, 1—1 designate the supporting wheels of the machine the same carrying spindles 2 and 3 which extend in opposite directions from an arched axle 4. Journaled within the upper portion of this axle is a shaft 5 on which is loosely mounted a sprocket 6 designed to be locked to the shaft by means of a clutch 7 of any preferred construction and disposed to be actuated by means of a lever 8 pivotally mounted on an arm 9 extending laterally from the axle. Sprocket 6 is designed to be driven by a chain 10 from a large sprocket 11 mounted on the spindle 2 and secured to the adjoining wheel 1 so as to rotate therewith.

Pivotally mounted upon the shaft 5 and beyond the side portions of axle 4 are hangers 12, the lower ends of which are secured to and connected by a transversely extending head 13 from which extend downwardly and forwardly curved tines 14 which gradually taper toward their front ends as indicated in Fig. 3 and are designed to swing into position under the axle 4 as indicated in Fig. 1, said tines being substantially concentric with the shaft 5. In view of the length of the head 13 the same is preferably reinforced longitudinally by means of a truss rod 15 secured at its ends to the end portions of the head and mounted at intermediate points upon brackets 16 extending from the head.

Pivotally mounted on shaft 5 at points between the side portions of axle 4 are arms 17 the rear or free ends of which constitute bearings for a shaft 18. This shaft has a sprocket 19 thereon designed to be driven by a chain 20 extending over a sprocket 21 secured to shaft 5. The distributing or spreading cylinder 22 is secured to the shaft 18 between the arms 17 and has series of elongated teeth 23 radiating therefrom.

Pivotally mounted upon each spindle 3 is a lever 24 which extends in front of the machine while its rear end is connected by means of a chain 25 or other flexible device with one end of a cross bar 26 located between the lower portions of the wheels 1. Resting on this cross bar is a series of longitudinally extending gathering fingers 27 connected at their front ends by means of a front plate 28 to the sides of which are secured guard strips 29 extending longitudinally above and adjacent the side fingers 27. These fingers are so located as to receive the tines 14 between them and each of the fingers preferably tapers rearwardly as indicated in Figs. 1 and 3 so as to be readily pushed into a pile of material to be placed upon the machine. The front plate 28 is mounted between upstanding face plates 30 riveted or otherwise secured to the side portions of the front plate.

Each spindle 2 and 3 and the end portions of shaft 5 constitute guides for a frame made up of similar spaced frame sections 31 which are arched and extend longitudinally of and adjacent the side portions of axle 4 and over the upper or intermediate portion of the axle. These spaced frames are rigidly connected at their lower ends by the guard strips 29 and at their upper or intermediate portions by means of spacing strips 32 or in any other preferred manner. Inclined braces 33 connect the side plates 30 with the side portions of the vertical frame and said frame and the side plates are also preferably connected by means of horizontal braces 34. The two sections 31 are preferably formed of angle irons as are also braces 33.

Brackets 35 are connected to the sides of the upper portion of frame 31 and extending from these brackets is an arched inclined frame 36 which overhangs the rear portion of the beam and carries at the sides of its uppermost portion guide pulleys 37. Mounted on each of these pulleys is a hoisting element 38 preferably in the form of a cable the lower end of each element being fastened to a bracket 39 secured to head 13 at one end. Both of these flexible elements pass over guide shafts 40 connected to frame 31 and are fastened at one end to a drum 41 mounted on a standard 42 which extends upward from the front plate 28 and is designed to be rotated in any suitable manner as by means of a crank 43. Any suitable means, not shown, may be employed for preventing the drum from rotating in a direction to unwind the elements 38.

Pivotally connected to the lower end portions of each arm 17 is a rod 44 having a rack bar 45 formed integral therewith and each rack bar meshes with a gear 46 secured to a shaft 47 which is journaled on the front plate 28 and is designed to be rotated by means of a crank 48 or in any other preferred manner. Any suitable means may be employed for holding the shaft against rotation in one direction and it is not deemed necessary to illustrate said means. A band wheel 49 is secured to this shaft and mounted thereon is a brake band 50 one end of which is connected to a foot lever 51 pivotally mounted on a bracket 52 mounted on a platform 53 extending forward from the lower portion of the plate 28. By depressing this lever the shaft 47 can obviously be held against rotation.

Pulleys 53' are arranged in front of the side portions of plate 28 and extending partly around these pulleys is a cable 54 or other flexible element which also extends under pulleys 55 loosely mounted on the spindles 2 and 3. The rear ends of this cable are fastened to the head 13 while the intermediate portion of the cable extends loosely across the front of the machine. A tongue 56 extends forward from the central portion of the platform 53 and is preferably secured in place by means of a connecting member 57 in the form of a casting having a series of apertures 58 any one of which is designed to receive a securing pin for the purpose of fastening the tongue at a desired angle to the platform.

When it is desired to load the machine the fork consisting of head 13 and tines 14 is swung to raised position as indicated by dotted lines in Fig. 1, by means of the drum 41 and connections 38. The fingers 27 and the entire frame to which they are connected are then lowered close to the ground by moving the forward ends of levers 24 upward and permitting the supporting bar 26 to move downward. The machine is then moved in the direction of the pile of manure so as to cause the fingers 27 to move thereinto. The fork 13—14 is then released by unwinding the cables 38 from drum 41 after which the draft animal or animals are connected to the cable 54 and driven forward so as to cause the tines 14 to swing downward into the manure and to assume positions between the fingers 27 and thus gather a large portion of manure onto the machine. By pushing downward on levers 24 bar 26 is pulled upward and causes the movable frame to travel upward on its guides, to wit, the end portions of shaft 5 and the spindles 2 and 3. The machine is then drawn forward and the distributing cylinder adjusted downward against the load by means of the gears 46 and rack bars 45. The rotation of the wheels 1 will cause motion to be transmitted therefrom through chain 10 and sprockets 11 and 6 to shaft 5 and thence through sprocket 21 and chain 20 to the shaft of the distributing cylinder. The cylinder will thus be rotated so as to cause the teeth 23 to throw the material rearwardly beyond the head 13 of the fork. As the load diminishes in size, the distributing cylinder can be moved further downward and forward by manipulating the gears 46 and rack bars 45 and in order that all portions of the load may be reached by the teeth 23 the fingers 27 can be adjusted upwardly by means of the levers and in the manner heretofore set forth.

Although no such means have been shown it is to be understood that ratchets or other locking devices are to be employed for securing the levers 24, and drum 41 against movement after the parts have been properly adjusted. Lever 51 can also be provided with locking means so that the band 50 can be held in frictional engagement with drum 49 to hold shaft 47 against rotation.

By throwing the clutch 7 into or out of engagement with gear 6 the operation of the distributing cylinder can be readily controlled.

What is claimed is:

1. In a machine of the character described the combination with a portable frame, and oscillating means for engaging a load and holding it upon the frame; of a distributing cylinder carried by the frame and mounted to oscillate relative to the frame and to the engaging means, and mechanism for rotating the cylinder for throwing from the machine material engaged by the cylinder.

2. In a machine of the character described the combination with a wheel supported frame, a fork carried thereby, loading means carried thereby, and a fork included in said loading means; of a cylinder mounted to oscillate relative to the frame and loading means and supported to engage the load, and means operated by the movement of the machine for actuating the cylinder.

3. In a machine of the character described the combination with a vertically adjustable portable frame, a fork carried thereby, oscillatory loading mechanism upon the frame, and a fork carried thereby; of oscillatory distributing means carried by the frame, mechanism for adjusting said means to different elevations relative to the load, and mechanism for rotating said means in any position to which it may be adjusted.

4. In a machine of the character described the combination with a vertically adjustable portable frame, a fork carried thereby, oscillatory loading mechanism, and a fork included in the loading mechanism; of distributing means carried by the frame, mechanism for swinging said means to different elevations relatively to the load, and means for elevating the load relatively to the distributing means.

5. In a machine of the character described the combination with a portable frame, a fork carried thereby, loading mechanism upon the portable frame, and a fork included in said loading mechanism; of a revoluble distributing device carried by the frame and comprising oscillatory arms, a toothed cylinder carried thereby, and separate simultaneously operated reciprocal means connected to the arms for holding the cylinder at a desired elevation.

6. In a machine of the character described the combination with an arched axle, supporting wheels therefor, and a shaft journaled upon the axle; of a frame guided by the axle and shaft and adjustable to different elevations upon the axle, gathering fingers carried by the frame, an oscillatory fork suspended upon the axle and coöperating with the fingers to gather and retain a load, an oscillatory revoluble distributing device suspended from the shaft, and mechanism for transmitting motion from a supporting wheel to the shaft and from said shaft to the distributing device.

7. In a machine of the character described, the combination with a frame having a forked bottom and holding fingers mounted to oscillate relatively to the frame and to work into the forked bottom; of an oscillating distributing cylinder mounted above the fingers, mechanism for rotating said cylinder irrespective of its adjustment, and means for adjusting the cylinder and locking it against movement.

8. In a machine of the character described, the combination with wheel supported gathering fingers and a fork pivotally supported above said fingers and having tines movable longitudinally between the fingers; of a distributing cylinder mounted to swing above said fork and fingers, and means for positively shifting the cylinder relative to the fork.

9. In a machine of the character described, the combination with wheel supported gathering fingers and a fork pivotally supported above said fingers and having tines movable longitudinally between the fingers; of a distributing cylinder mounted to swing above said fork and fingers, means operated by the movement of the machine for rotating the cylinder, means for positively shifting the cylinder in either direction relative to the fork, and means for locking the cylinder in adjusted position.

10. In a machine of the character described, the combination with movably supported gathering fingers, oscillatory hangers supported thereabove, and a fork movable with the hangers for filling the spaces between the fingers; of a distributing cylinder adjustably supported above the fingers and fork.

11. In a machine of the character described, the combination with movably supported gathering fingers and means for retaining a load thereon; of arms mounted to oscillate above said fingers, a distributing cylinder carried thereby, a rack-bar connected to one of the arms, and revoluble means for actuating the bar to shift the arms and cylinder.

12. In a machine of the character described, the combination with an arched axle and supporting wheels therefor, of a frame slidably mounted upon the axle, means for adjusting the frame vertically, gathering fingers movable with the frame, an oscillatory fork suspended upon the axle and coöperating with and extending between the fingers to gather and retain a load, and a distributing cylinder adjustably supported above the fingers and fork.

13. In a machine of the character described, the combination with an arched axle and supporting wheels; of a frame adjustable to different elevations upon the axle, gathering fingers movable with the frame, an oscillatory fork suspended upon the axle, means for swinging said fork into a raised position, means for directing the tines of the fork longitudinally between and in the direction of the lengths of the fingers to gather a load and to retain it above the fingers, oscillatory arms carried by the axle, a revoluble distributing cylinder upon the arms, and means for shifting the arms relative to the fork and fingers.

14. In a machine of the character described, the combination with an arched axle and supporting wheels therefor, of an adjustably supported distributing cylinder carried by the axle, and a frame supported by and adjustable vertically relatively to the axle.

15. In a machine of the character described, the combination with an arched axle and supporting wheels therefor, of an adjustably supported distributing cylinder carried by the axle, a series of gathering fingers, and an oscillatory fork having tines insertible between said fingers, said fork and fingers being adjustable vertically relatively to, and supported by, the axle.

In testimony that I claim the foregoing as my own, I have hereto affixed my signature in the presence of two witnesses.

IRA E. QUAINTANCE.

Witnesses:
   LEWIS ARTHUR HENDERSON,
   J. W. WRIGHT.